N. B. McCREARY & H. L. CRIST.
Fly-Traps.
No. 146,194. Patented Jan. 6, 1874.
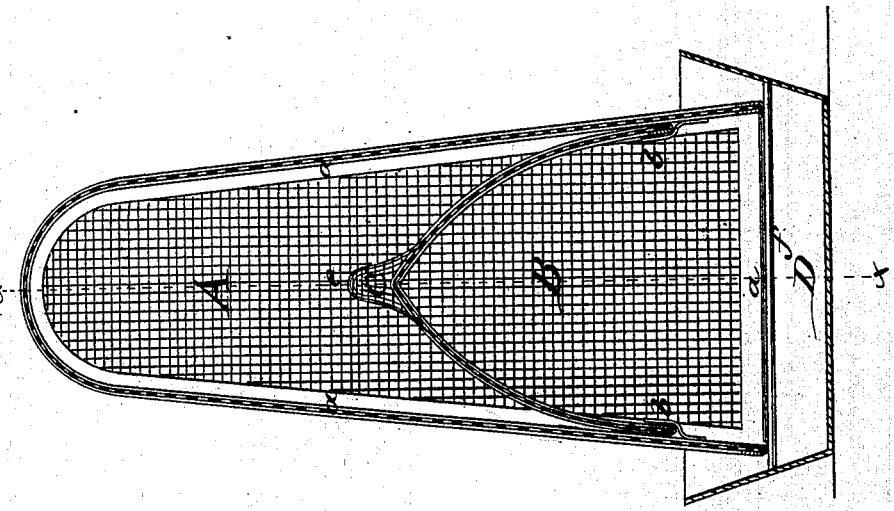
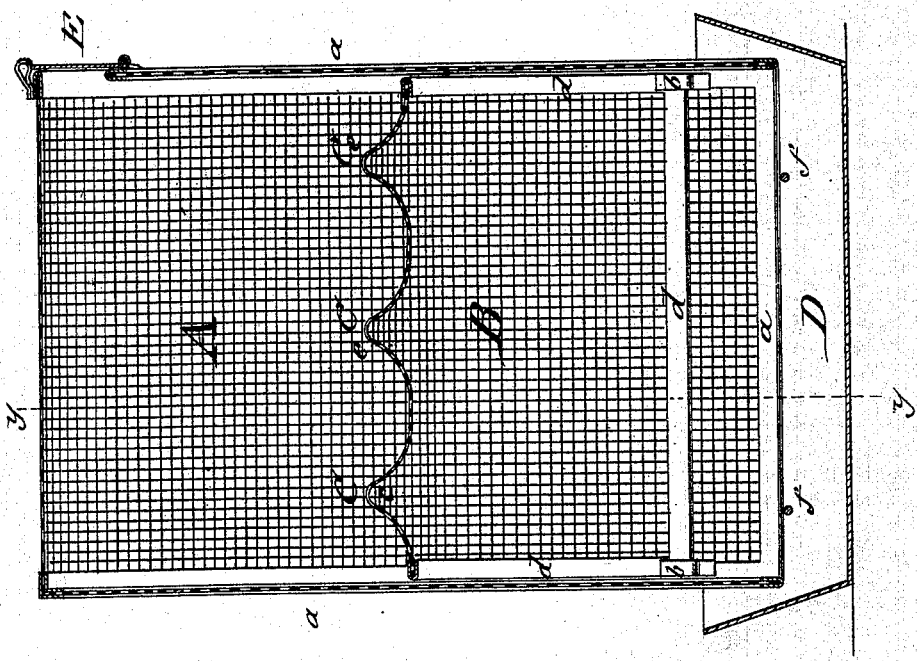
Witnesses:
E. Wolff
E. Sedgwick
Inventor:
N. B. McCreary
H. L. Crist
Per
Attorneys.

UNITED STATES PATENT OFFICE.

N. BARKER McCREARY AND HENRY L. CRIST, OF PHELPS CITY, MISSOURI.

IMPROVEMENT IN FLY-TRAPS.

Specification forming part of Letters Patent No. 146,194, dated January 6, 1874; application filed September 20, 1873.

*To all whom it may concern:*

Be it known that we, N. BARKER McCREARY and HENRY L. CRIST, of Phelps City, in the county of Atchison and State of Missouri, have invented a new and Improved Fly-Trap, of which the following is a specification:

In the accompanying drawing, Figures 1 and 2 represent, respectively, vertical longitudinal and vertical transverse sections of our improved fly-trap on the lines $x\ x$ and $y\ y$.

Similar letters of reference indicate corresponding parts.

Our invention is an improvement in the class of insect-traps formed of an inner and outer wire-gauze cage. The invention consists in the construction of the inner cage, and the means of attaching the same to the outer cage, as herein described.

In the drawing, A represents the outer cage or cone, which is made of wire-gauze, in the shape of a truncated pyramid, having the top rounded off. The sides and bottom edges of cage A are connected by suitable linings $a$, of tin or other sheet metal, producing the required strength and durability of the cage. The interior cage, B, is formed of a plate or sheet of wire-gauze, which is cut to the required size and shape, (rectangular,) and has small conical projections C, with openings $e$, formed by stretching the material along the transverse middle of the plate. The edges are bound or inclosed by sheet-metal strips $d$, so that when the plate is bent and placed in the cage A said edges come into close contact with the inner sides of the latter, thus preventing escape of the flies from the upper chamber, into which they pass through the opening $e'$.

It will be seen that the ends of the cage A form the sides of the cage B.

To connect the cage B with A, and thus enable the trap to be moved as a whole from one place to another, and yet the two parts or cages to be readily disconnected when necessary or desired, I employ catches or hooks $b$, applied to the inner side of the cage A, as shown.

The outer cage, A, rests on the cross-bars $f$ of a bait-pan, D, which is of sufficient depth and width to extend around the base of cage A, and admits easily the flies to the bait at the bottom thereof, from which they pass through the cones C into the upper chamber, where they are killed by hot water, heat, or other suitable means. A small door, E, is hinged at one side, near the top part of cage A, and serves for the purpose of removing the flies without detaching the inner cage, B.

The simple construction of parts allows the manufacture of these fly-traps at small cost and at any place.

Having thus described our invention, we claim as new and desire to secure by Letters Patent—

In combination with the cage A, the inner cage, B, formed of a bent and apertured wire-gauze plate, B, the latter being connected to and supported within the former by the catches $b$, as shown and described.

N. BARKER McCREARY.
HENRY L. CRIST.

Witnesses:
J. N. WHITE,
A. A. TAYMAN.